3,348,973
SECONDARY BATTERY
Thedford P. Dirkse, Grand Rapids, Mich., assignor to Calvin College and Seminary, Grand Rapids, Mich., a corporation of Michigan
No Drawing. Filed Aug. 10, 1966, Ser. No. 571,405
14 Claims. (Cl. 136—30)

ABSTRACT OF THE DISCLOSURE

A battery electrode and an electro-chemical battery cell, employing a zinc electrode and containing an additive of the general formula of tridecyloxypoly (ethylenoxy) ethanol, preferably in the zinc electrode.

---

This invention relates to batteries and battery electrodes, and more partciularly to an electro-chemical battery cell employing a zinc electrode, and to an additive for such.

Alkaline batteries employing zinc electrodes, usually in combination with silver oxide electrodes, have a significant and relatively serious deficiency, which is the loss of capacity of the cell after a period of operation. Careful analysis of failed cells shows that this is caused by the zinc electrode having lost its capacity. This is believed due to agglomeration and densification of the porous zinc material, with a consequent reduction in available surface area of the active material, so that the cell no longer can supply current at anything other than very low rates of discharge.

In discovering this invention, the inventor herein experimented extensively with various techniques in efforts to prolong the life of cells containing zinc electrodes, and discovered that, for some reason which is not completely technically understood, a particular related group of additives (having a common chemical formula) is capable of remarkably extending the life of zinc electrodes in alkaline batteries.

It is therefore an object of this invention to provide an alkaline battery of the zinc electrode type, having a markedly increased useful life than that of conventional types.

Another object of this invention is to provide an electro-chemical cell employing a zinc electrode and having a special additive that uniquely extends the cycling life of the cell a marked amount. The unique results occur whether the additive is added to the electrolyte, or to the zinc electrode, but provides greater life extension when the additive is in the zinc electrode.

Another object of this invention therefore is to provide a novel zinc battery electrode, having a considerably extended useful life over known types of zinc electrodes.

These and other objects of this invention will become apparent upon studying the following specification.

The invention centers around the concept that a zinc electrode in an electro-chemical battery cell, particularly an alkaline cell, has a greatly increased useful life when an additive of the general formula of tridecyloxypoly (ethylenoxy) ethanol is employed. The additive is preferably employed in the zinc electrode itself, but may be dissolved in the electrolyte. The number of ethylenoxy groups can vary between two and fifteen, although the compound containing six ethylenoxy groups is especially preferred. Further, the concentration of the additives need only be a tiny amount, with the concentration of 0.5% by weight of the zinc electrode producing the best results, but being variable from a slight trace, e.g. around 0.02% by weight or so, up to substantial amounts. A practical maximum is about 5% by weight of the zinc electrode, since amounts greater than this do not appear to increase the life further.

The second electrode normally used with the zinc electrode is silver oxide, although electrodes such as nickel oxide or air might be employed to form cells of the zinc-nickel oxide type and zinc-air type.

In conceiving and reducing this invention to practice, the inventor herein and his associates conducted extensive experimentation over a period of many months to determine the above facts. Many additives were tried but most were not effective. Of the unique group, moreover, the results of this experimentation show that the less effective additives of the noted group, e.g. those containing the higher number of ethylenoxy groups, e.g. 15, increase the cell and electrode life by about 100%, while the most effective additive, that containing six ethylenoxy groups, increased the cell and electrode life by about 270% or so, depending upon the concentration of the additive. As noted, the additive is most effective when employed in a concentration of about 0.5% by weight of the electrode. Usually, at least about 0.15% by weight should be added for assuring good action.

Of the hundreds of experiments run over the extended period of time, the following experiments are set forth as representative examples:

Example 1

Seventy-two like electro-chemical battery cells were each constructed to have a silver oxide of electrode and a zinc electrode, in an alkaline electrolyte. As is known with regard to alkaline cells, the range of the alkaline concentration can vary considerably, and was normally kept within the usual 25 to 45 percent hydroxide ion concentration in an aqueous solution. In this first experiment, sodium hydroxide of about 45% concentration was employed. The cells were fabricated so as to be as closely identical to each other as possible. They were also operated under identical conditions, with 18 cells comprising control cells with no additive, 18 cells containing tridecycloxyhexa (ethylenoxy) ethanol in a concentration of 0.5% by weight of the zinc electrode, 18 cells containing the noted additive in a concentration of 0.75% by weight of the zinc electrode, and 18 cells containing the noted additive in a concentration of 1.0% by weight of the zinc electrode. In this first example, the additive was incorporated into the zinc electrodes, during fabrication of the electrodes, so that the additive was dispersed generally uniformly throughout the electrodes.

The result of each group of 18 cells was averaged as to the cycle life data, with the number of cycles of the control cells being about 335, that of the 0.5% concentration cells being about 613, and that of the 0.75% concentration cells being about 509 cycles, and that of the 1.0% concentration cells being about 559 cycles.

As can be readily noted, the additive caused considerable extension of the useful life over the conventional cell, with variation occurring between the different concentrations.

Example 2

This experiment was run in a manner very similar to that of Experiment 1, except that the additive contained 15 ethylenoxy groups rather than 6. The averaged results of the 18 cells for each group showed that the number of cycles of the control cell was 335, of the 0.5% concentration was 412 cycles, that of the 0.75% concentration was 446, and that of the 1.0% concentration was 406 cycles.

Again it will be noted that the useful life of the cell was extended considerably, although under these conditions and with this particular additive, the useful life was not extended as greatly as with the additive containing 6 ethylenoxy groups.

Example 3

In this instance, a large number of cells were again employed for each concentration, the number varying between 18 and 20 cells, with the results of each group being average. The cells in this instance were of a type to have a capacity of about 25 ampere hours initially. The control cells were operated without any additive and cycling at 40% depth of discharge. The additive employed was tridecyloxyhexa (ethylenoxy) ethanol, in two selected concentrations of 0.15% by weight of the zinc electrode, and 0.35% by weight of the zinc electrode. The experimental cells were operated with some cycling 25% depth of discharge, and some 40% depth of discharge.

The results showed the control cells to have a cycle life of 250 cycles, the cells with 0.35% additive cycling at 40% depth of discharge to have a cycle life of 425 cycles, the cells containing 0.35% additive cycling at 25% depth of discharge to have a cycle life of 750 cycles, the cells containing 0.15% additive cycling at 40% depth of discharge to have a cycle life of 625 cycles, and the cells containing 0.15% by weight additive cycling at 25% depth of discharge to have a cycle life of 750 cycles.

The increase over conventional cells was very remarkable.

Example 4

Another set of many cells was operated with the preferred additive containing 6 ethylenoxy groups. In this instance, the additive was added in concentrations of 0.15% by weight, 0.30% by weight, 0.6% by weight, and 1.0% by weight.

Example 5

This experiment is conducted similar to Experiment No. 1 above, but employing potassium hydroxide as the alkaline material in the electrolyte, rather than sodium hydroxide.

Example 6

This experiment is similar to No. 1 noted above, but employs an additive with a different number of ethylenoxy groups at concentrations ranging from a trace amount up to about 5% by weight:

(a) Two ethylenoxy groups
(b) Three ethylenoxy groups
(c) Four ethylenoxy groups
(d) Five ethylenoxy groups
(e) Six ethylenoxy groups
(f) Seven ethylenoxy groups
(g) Eight ethylenoxy groups
(h) Nine ethylenoxy groups
(i) Ten ethylenoxy groups
(j) Eleven ethylenoxy groups
(k) Twelve ethylenoxy groups
(l) Thirteen ethylenoxy groups
(m) Fourteen ethylenoxy groups
(n) Fifteen ethylenoxy groups

Example 7

This example is similar to No. 1 above, but employing the following electrode combinations in the alkaline cells:

(a) Zinc-nickel oxide electrodes
(b) Zinc-air electrodes

Example 8

In this set of experiments, the concentration of the additive varied from 0 (control) to 5% by weight of the negative zinc electrode plate. The averaged result for the many cells used in each instance were as follows:

| Concentration (percent by weight) | Cycle life |
|---|---|
| 0 | 230 |
| 0.15 | 550 |
| 0.35 | 600 |
| 0.5 | 615 |
| 1.0 | 580 |
| 3.0 | 480 |
| 5.0 | 400 |

It will be noted that the additive range of up to 1% by weight provides the optimum results, and therefore, constitute the preferred range.

The mechanism by which the additive works to increase cycle life is unknown, although the effect clearly seems to delay the agglomeration and densification of the zinc active material. Extensive experimentation with other additives known to have surface active characteristics indicates that the organic molecular structure of this particular noted group is apparently the key to being able to increase the life.

Hundreds of additional examples could be set forth in detail herein on the basis of the extensive experimental work done. However, the noted examples serve to clearly set forth the concept and to teach one having ordinary skill in the art how to practice the inventive concept and the preferred composition and ranges involved. Therefore, it is believed that further innumerable examples would merely be superfluous and would not add significantly to the concept or teachings presented.

In addition, those skilled in this art will readily recognize that the chemical cells can be modified in various conventional ways while using the concept presented. Therefore, it is intended that the invention is limited only by the scope of the appended claims and the reasonable equivalents thereto.

I claim:

1. A battery electrode comprising a zinc element containing at least some and up to about 5% by weight tridecyloxypoly (ethylenoxy) ethanol.

2. The electrode in claim 1, wherein said tridecyloxypoly (ethylenoxy) ethanol contains between 2 and 15 ethylenoxy groups.

3. The electrode in claim 2, wherein said tridecyloxypoly (ethylenoxy) ethanol is one of a group consisting of such compound containing 6 ethylenoxy groups, and containing 15 ethylenoxy groups.

4. The electrode in claim 1, wherein said tridecyloxypoly (ethylenoxy) ethanol comprises tridecyloxyhexa (ethylenoxy) ethanol.

5. The electrode in claim 1, wherein said tridecyloxypoly (ethylenoxy) ethanol is present in an amount less than about 1% by weight of the zinc electrode.

6. The electrode in claim 1, wherein said tridecyloxypoly (ethylenoxy) ethanol is present in an amount of about 0.5% by weight of the zinc electrode.

7. An electro-chemical battery cell comprising an alkaline electrolyte and electrodes immersed therein, one of said electrodes comprising a zinc element, and said cell including therein an additive having the general formula of tridecyloxypoly (ethylenoxy) ethanol.

8. The cell in claim 7, wherein said compound is dissolved in said electrolyte.

9. The cell in claim 7, wherein said compound is in said zinc electrode.

10. The cell in claim 7, wherein said compound contains between 2 and 15 ethylenoxy groups.

11. The cell in claim 7, wherein said compound is present in an amount up to about 5.0% by weight of the zinc electrode.

12. The cell in claim 7, wherein said compound is present in an amount of about 0.5% by weight of said zinc electrode.

13. The cell in claim 7, wherein said compound is present in an amount of at least about 0.15% by weight of said zinc electrode.

14. The cell in claim 7, wherein said compound contains 6 ethylenoxy groups.

No references cited.

WINSTON A. DOUGLAS, *Primary Examiner.*

C. F. LE FEVOUR, *Assistant Examiner.*